United States Patent [19]

Furue et al.

[11] Patent Number: 4,833,378
[45] Date of Patent: May 23, 1989

[54] MOTOR CONTROL METHOD AND APPARATUS

[75] Inventors: Ryosuke Furue; Toshitaka Agano, both of Kanagawa, Japan

[73] Assignee: Fuji Photo Film Co., Ltd., Kanagawa, Japan

[21] Appl. No.: 144,584

[22] Filed: Jan. 6, 1988

Related U.S. Application Data

[63] Continuation of Ser. No. 795,966, Nov. 7, 1985, abandoned.

[30] Foreign Application Priority Data

Nov. 7, 1984 [JP] Japan ............................... 59-234640

[51] Int. Cl.$^4$ ............................................. H02P 3/10
[52] U.S. Cl. ................................................... 318/374
[58] Field of Search ............... 318/373, 374, 561, 369, 318/611

[56] References Cited

U.S. PATENT DOCUMENTS

| | | | |
|---|---|---|---|
| 2,449,223 | 9/1948 | Hayman | 318/374 X |
| 2,475,169 | 7/1949 | Zahn | 318/374 X |
| 2,566,210 | 8/1951 | Kendall | 318/374 X |
| 2,886,756 | 5/1959 | Schaefer | 318/374 X |
| 3,836,833 | 9/1974 | Harris | 318/369 X |
| 3,969,663 | 7/1976 | Arthur | 318/374 X |
| 4,072,879 | 2/1978 | Wadleigh | 318/369 X |
| 4,184,107 | 1/1980 | Turini | 318/611 X |
| 4,473,786 | 9/1984 | Miyashita | 318/561 |
| 4,490,661 | 12/1984 | Brown et al. | 318/254 X |
| 4,516,514 | 5/1985 | Neki | 318/369 X |
| 4,549,120 | 10/1985 | Banno | 318/373 X |
| 4,629,949 | 12/1986 | Senso | 318/374 X |

FOREIGN PATENT DOCUMENTS

| | | | |
|---|---|---|---|
| 52-34310 | 3/1977 | Japan | 318/373 |
| 57-148585 | 9/1982 | Japan | 318/373 |
| 58-163281 | 9/1983 | Japan | 318/373 |

*Primary Examiner*—Bentsu Ro
*Attorney, Agent, or Firm*—Sughrue, Mion, Zinn, Macpeak & Seas

[57] ABSTRACT

A motor control method and apparatus in which when a motor rotating at prescribed RPM is to be stopped, a reverse maximum voltage is applied to the motor to rotate it in a reverse direction. Upon reversal of the direction of rotation of the motor, the reverse maximum voltage is cut off to stop the rotation of the motor in a shortest period of time.

2 Claims, 4 Drawing Sheets (a)

(b)

MOTOR CONTROL METHOD AND APPARATUS

This is a continuation of application Ser. No. 95,966 filed Nov. 7, 1985, now abandoned.

BACKGROUND OF THE INVENTION

The present invention relates to a motor control method and apparatus, and more particularly to a method of and an apparatus for controlling a secondary scanning motor employed in a radiation image information readout device, a radiation image information recording device, a facsimile machine, or the like for reading or recording image and character information.

There have been developed radiation image information readout devices for reading radiation image information recorded on an image information carrier such as a stimulable phosphor sheet.

When a certain phosphor is exposed to a radiation such as X-rays, α-rays, β-rays, γ-rays, ultraviolet rays, or electron beams, the phosphor stores a part of the energy of the radiation. When the phosphor exposed to the radiation is exposed to stimulating rays such as visible light, the phosphor emits light in proportion to the stored energy of the radiation. The phosphor exhibiting such a property is referred to as a "stimulable phosphor".

The applicant has proposed radiation image readout systems employing a sheet of such a stimulable phosphor. The radiation image of an object such as a human body is recorded on the stimulable phosphor sheet, and then the stimulable phosphor sheet is exposed to stimulating light for emitting light therefrom which is read by a photoelectric transducer as an electric signal that is utilized for various diagnostic purposes. See for example U.S. Pat. Nos. 4,258,264, 4,276,473, and 4,315,318.

In one of the radiation image readout systems, the stimulable phosphor sheet is fed by a sheet feeder at a constant speed during which time the sheet is scanned with stimulating light one-dimensionally in a direction normal to the direction of feed of the sheet. The light emitted from the sheet upon exposure to the stimulating light is photoelectrically read to produce radiation image information in the form of an electric signal.

More specifically, the stimulable phosphor sheet is mechanically fed in one direction for secondary scanning thereof, while at the same time a light beam such as a laser beam is swept one-dimensionally over the sheet in the direction perpendicularly to the sheet feeding direction for primary scanning of the sheet. Therefore, the stimulable phosphor sheet is scanned two-dimensionally. The light emitted from the stimulable phosphor sheet is detected on a time series basis by a light detector such as a photomultiplier to produce image information.

For improving the readout accuracy, it has been proposed to make a mechanical improvement for feeding the stimulable phosphor sheet at a constant speed. In addition, it has also been proposed to feed the stimulable phosphor sheet in one direction for reading the radiation image in a pre-reading mode, and then feed the stimulable phosphor sheet in the opposite direction to read the radiation image in a main reading mode. Various readout conditions in the main reading mode can be established on the basis of information attained in the pre-reading mode.

The stimulable phosphor sheet is actually fed on an endless feed belt. Since it is necessary to keep the same laser beam scanning position in the pre-reading and main reading modes, the endless feed belt comprises a perforated endless belt and a suction box is disposed below the endless belt for attracting the stimulable phosphor sheet to the endless belt to maintain the sheet and the endless belt in the same relative position.

To utilize the effective area of the stimulable phosphor sheet to the maximum extent, radiation image information is recorded on the sheet as fully over its length in the direction of feed thereof as possible. It is therefore preferable for the secondary scanning motor to be rotatable selectively in one direction or the other at a constant speed and also to be able to stop its rotation within a minimum period of time after application of a stop signal to the motor, so that the recorded information can be read to a maximum extent and free of distortions from the stimulable phosphor sheet.

If the period of time required for the motor to stop its rotation after the stop signal has been applied thereto is short, the motor can quickly be brought into a standby condition in preparation for a next information readout cycle.

SUMMARY OF THE INVENTION

It is an object of the present invention to provide a motor control method and apparatus capable of shortening the period of time as much as possible which is required for the motor to bring its rotation to an end after application of a stop signal thereto.

Another object of the present invention is to provide a method of controlling a motor to stop its rotation when the motor is driven to rotate at a speed of rotation dependent on a speed command signal, comprising the steps of applying a signal indicative of a reverse maximum speed to the motor from the time a rotation stop command is applied, thereafter detecting the direction of rotation of the motor, and applying a signal indicative of a substantially zero speed to the motor from the time a reversal of the direction of rotation of the motor is detected.

Still another object of the present invention is to provide an apparatus for controlling a motor, comprising a motor, direction detecting means for detecting the direction of rotation of the motor, speed indicating (motor rotating) means for rotating the motor at a prescribed speed, rotation stop means for cutting off an output signal applied by the speed indicating means to the motor, reverse maximum speed indicating means for issuing a signal to rotate the motor at a maximum speed in a reverse direction which is opposite to the direction in which the motor is rotated by the speed indicating means, and a selector circuit responsive to an output signal from the rotation stop means for effecting switching from the signal of the speed indicating means to the signal of the reverse maximum speed indicating means for application to the motor.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
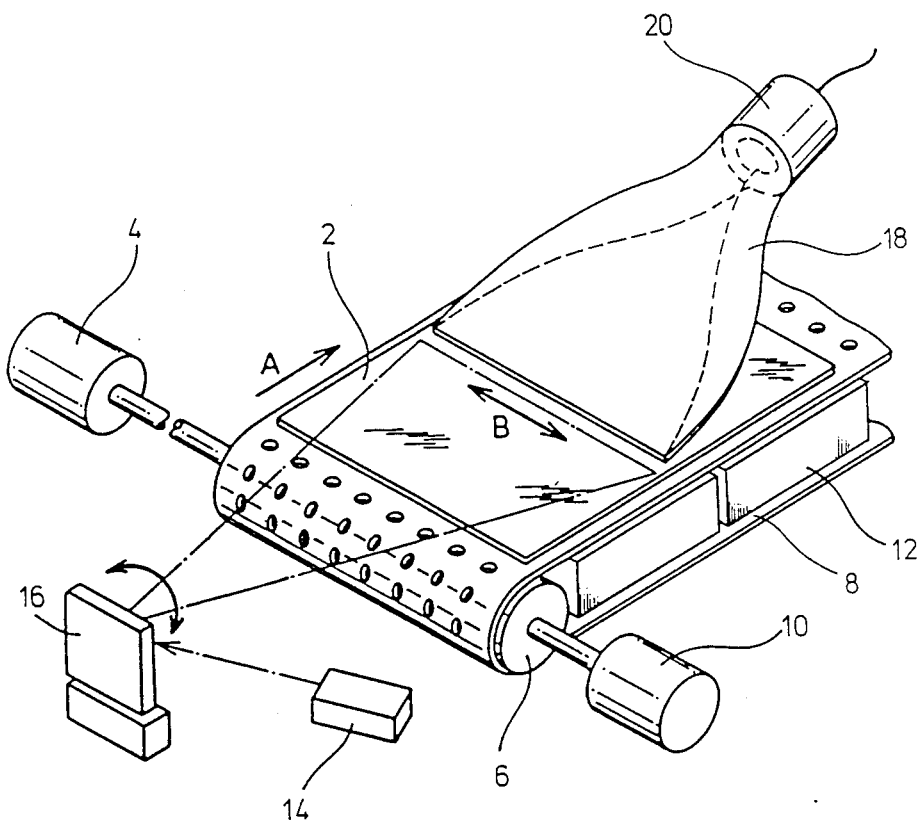
FIG. 1 is a schematic perspective view of a radiation image information readout device employing a motor control method of the present invention.

As shown in FIG. 1, a radiation image information readout device in which the present invention can be incorporated includes a stimulable phosphor sheet 2 serving as a recording medium on which a radiation image is recorded. Upon exposure to stimulating light in the form of a laser beam emitted from a laser beam source 14, the stimulable phosphor sheet 2 emits light which is photoelectrically read to obtain the radiation image information recorded on the sheet 2. The stimulable phosphor sheet 2 is fed in a secondary scanning direction indicated by the arrow A by an endless belt 8 trained around a roller 6 driven by a motor 4. The belt 8 comprises a perforated suction belt having a plurality of holes defined therein, and a suction device 12 is disposed between the upper and lower runs of the belt 8. When the suction device 12 is actuated, the holes of the belt 8 communicate with the suction port (not shown) of the suction device 12 to draw air inwardly through the belt holes into the suction device 12 for thereby positioning the stimulable phosphor sheet 2 on the belt 8 without slippage thereon.

The roller 6 is connected coaxially to a rotary encoder 10 serving as a distance detecting means for detecting the distance which the stimulable phosphor sheet 2 is fed.

The laser beam source 14 serving as a stimulating light source preferably comprises an He - Ne laser. The laser beam emitted from the laser beam source 14 is directed to a galvanometer mirror 16 which scans the laser beam in a main scanning direction indicated by the arrow B. The stimulable phosphor sheet 12 irradiated with the laser beam emits light commensurate with the image information recorded on the sheet 12. The light emitted from the sheet 12 is led by a light guide 18 to a photomultiplier 20 which converts the detected light into an electric signal that is displayed on a CRT or the like.

Figure 2:
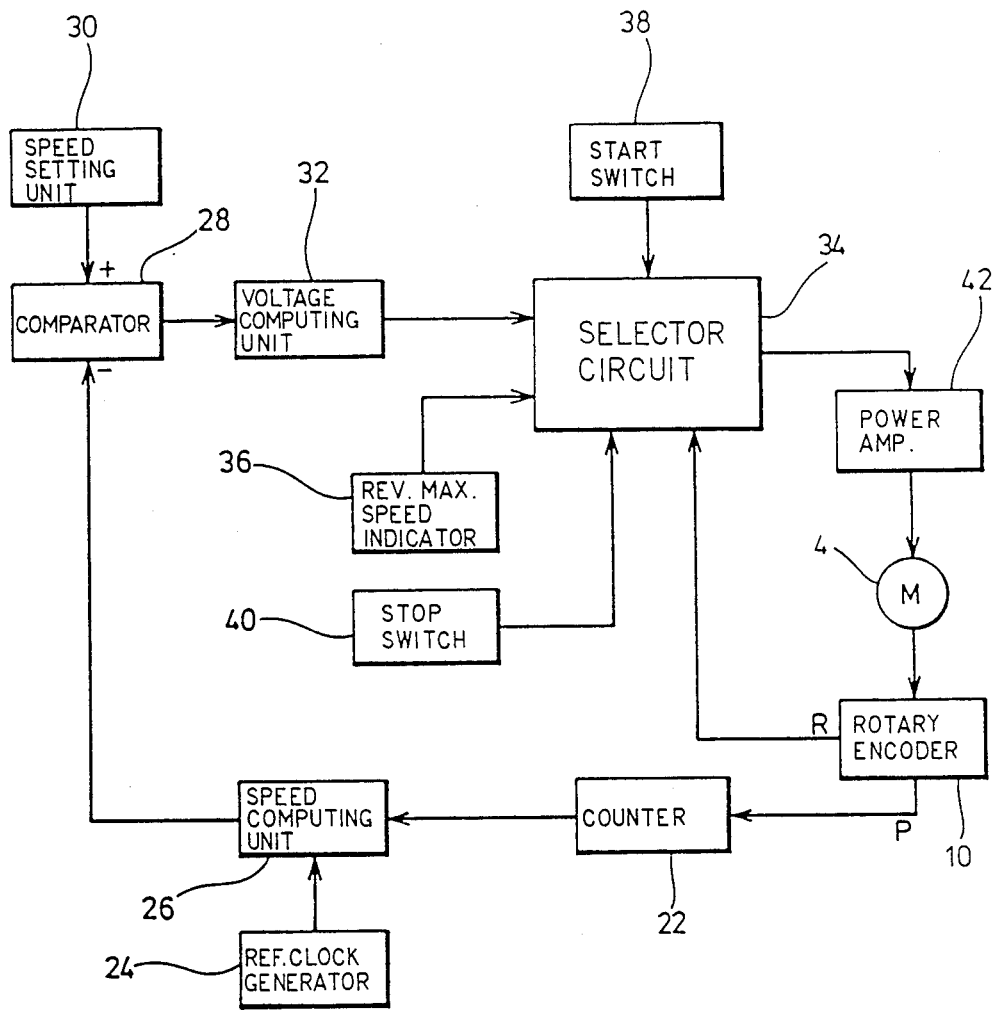
FIG. 2 is a block diagram of a circuit for effecting the motor control method of the invention.

FIG. 2 shows an electric circuit incorporated in the radiation image information readout device. The rotary encoder 10 generates output pulses P dependent on the RPM of the motor 4 through an output terminal connected to the input terminal of a counter 22. The counter 22 counts the output pulses P from the rotary encoder 10.

The counter 22 has an output terminal coupled to a speed computing unit 26 which computes the speed of movement of the suction belt 8, i.e., the speed of travel of the stimulable phosphor sheet 2 based on the count output from the counter 22 and reference clock pulses generated by a reference clock pulse generator 24. The speed computing unit 26 is arranged to detect a change in the count of the counter 22 between reference clock pulses as a speed signal. This is because the output pulses P from the rotary encoder 10 correspond to the rotation of the motor 4, and hence the count of the counter 22 corresponds to the distance which the stimulable phosphor sheet 2 is fed.

The speed computing unit 26 has an output terminal connected to one input terminal of a comparator 28 with its other input terminal coupled to the output terminal of a speed setting unit 30. The comparator 28 therefore detects the difference between the preset output from the speed setting unit 30 and the output from the speed computing unit 26, and applies the differential output to a voltage computing unit 32 which computes a voltage commensurate with the differential output and indicative of a speed. The speed-indicating (motor rotating) voltage issued from the output terminal of the voltage computing unit 32 is applied to a selector circuit 34. The selector circuit 34 is connected to the output terminal of a reverse maximum speed indicator 36.

To the selector circuit 34, there are also connected a rotation stop switch 40 and an output terminal of the rotary encoder 10 which produces an output R. The selector circuit 34 is responsive to the output signal from a rotation start switch 38 for selecting and issuing out the voltage generated by the voltage computing unit 32, and is also responsive to the output from the rotation stop switch 40 for selecting and issuing out the voltage generated by the reverse maximum speed indicator 36.

The selector circuit 34 is also arranged such that when the polarity of the output R of the rotary encoder 10 is reversed after the output signal has been generated by the rotation stop switch 40, the selector circuit 34 cuts off the voltage from the reverse maximum speed indicator 36. The output signal from the selector circuit 34 is amplified by a power amplifier 42 and then applied to the motor 4.

Figure 3:
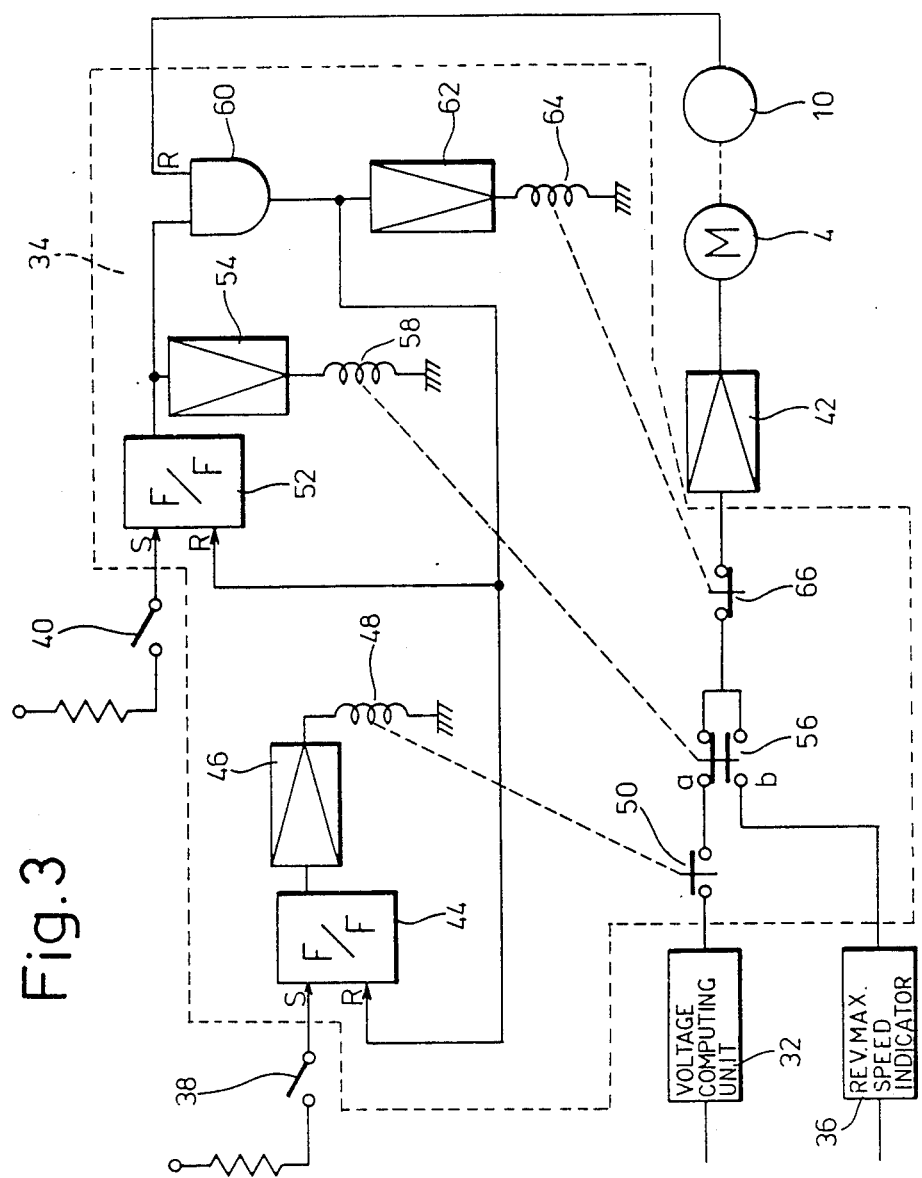
FIG. 3 is a block diagram of a selector circuit in the circuit shown in FIG. 2.

The selector circuit 34 is illustrated in greater detail in FIG. 3.

The rotation start switch 38 is connected to the SET terminal of a first flip-flop 44 with its output terminal connected through a first driver 46 to a first relay coil 48. The first relay coil 48 serves to open and close a first relay contact 50 connected to the output terminal of the voltage computing unit 32. The rotation stop switch 40 is connected to the SET terminal of a second flip-flop 52 having its output terminal connected through a second driver 54 to a second relay coil 58 which opens and closes a second relay contact 56.

The output terminal of the second flip-flop 52 is also connected to one input terminal of an AND gate 60, the other input terminal of which is supplied with the polarity reverse signal R from the rotary encoder 10. The output terminal of the AND gate 60 is coupled to the RESET terminals of the flip-flops 44, 52 and also to a third relay coil 64 through a third driver 62. The third relay coil 64 serves to open and close a third relay contact 66.

The output terminal of the reverse maximum speed indicator 36 is connected to a side b of the second relay contact 56, which is connected to the third relay contact 66. The first relay contact 50 is connected to a side a of the second relay contact 56.

Operation of the circuit shown in FIGS. 2 and 3 will be described below.

When the rotation start switch 38 is turned on instantaneously, it produces an output signal to set the first flip-flop 44. The output from the first flip-flop 44 then energizes the first relay coil 48 to close the first relay contact 50. At this time, the second relay contact 56 is on the side a, and the third relay contact 66 is closed. Therefore, the voltage computing unit 32 is connected through the relay contacts 50, 56, 66 to the power amplifier 42. Stated otherwise, the selector circuit 34 responds to the output signal from the rotation start switch 38 to select the output voltage from the voltage computing unit 32. The selected output voltage is then amplified by the power amplifier 42 and applied to the motor 4 to energize the same. The rotation of speed of the motor 4 rotated is detected by the rotary encoder 10. The pulsed output P from the rotary encoder 10 is counted by the counter 22, the count of which is converted by the speed computing unit 26 into a speed signal. The speed signal from the speed computing unit 26 is compared by the comparator 28 with the speed setting from the speed setting unit 30. The detected differential output from the comparator 28 is applied to the voltage computing unit 32 which issues a speed-indicating voltage representative of the differential output. Therefore, the rotation of the motor 4 is controlled so as to be equal to the rotation A corresponding to the speed setting of the speed setting unit 30 as shown in FIG. 4(a).

The stimulable phosphor sheet 2 is now fed at a constant speed by the motor 4 which is controlled to rotate as described above. When the stimulable phosphor sheet 2 has reached a prescribed position, a signal is generated by a detector (not shown) to actuate the rotation stop switch 40 which issues an output signal. The second flip-flop 52 is then set to energize the second relay coil 58 to shift the second relay contact 56 from the side a to the side b. As a consequence, the output signal from the reverse maximum speed indicator 36 is applied via the second and third relay contacts 56, 66 to the power amplifier 42, and the output voltage from the voltage computing unit 32 is blocked by the second relay contact 56 against application to the power amplifier 42. Thus, the selector circuit 34 responds to the output signal from the rotation stop switch 40 to select the output voltage from the reverse maximum speed indicator 36, rather than the speed-indicating voltage from the voltage computing unit 32. The selected output voltage is amplified by the power amplifier 42 and then applied to the motor 4. If the rotation stop switch 40 generates its output signal at a time $t_0$ (FIG. 4(a)), then the motor 4 is controlled from the time $t_0$ on to rotate at the rotation B corresponding to the output voltage from the reverse maximum speed indicator 36. Therefore, The rotation of the motor 4 is rapidly reduced and the motor 4 is then controlled to rotate in the reverse direction as shown in FIG. 4(a). When the rotation of the motor 4 is reversed, the polarity of the output R of the rotary encoder 10 is also reversed to cause the selector circuit 34 to stop the selection of the output voltage from the reverse maximum speed indicator 36. More specifically, when the polarity of the output R of the rotary encoder 10 is reversed, the AND gate 60 is opened to energize the third relay coil 64 for thereby opening the third relay contact 66. Therefore, the output voltage from the reverse maximum speed indicator 36 is cut off. As a result, the speed setting for the motor 4 is virtually zero, and no voltage is applied to the motor 4. The rotation of the motor 4 is stopped at a time $t_2$ as illustrated in FIG. 4(b).

Figure 4:
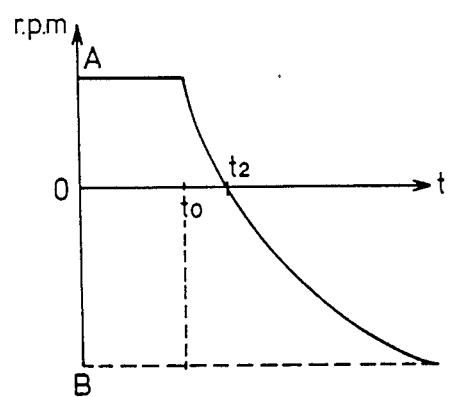
FIG. 4 is a set of graphs showing characteristic curves explanatory operation of the method according to the invention.
Figure 4:
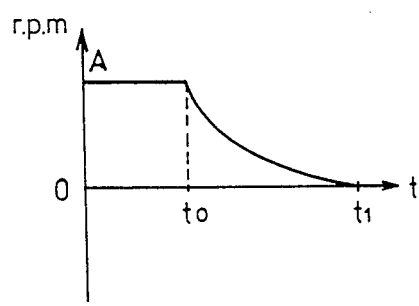

FIG. 4(b) shows a characteristic curve obtained at the time the voltage applied to the motor 4 is cut off simply by a command signal for stopping the rotation of the motor 4. In FIG. 4(b), it takes a period of time from $t_0$ to $t_1$ for the motor 4 to stop its rotation. According to the arrangement of the invention, however, the motor 4 can be stopped in the time interval from $t_0$ to $t_2$ (FIG. 4(a)) which is shorter than the time period from $t_0$ to $t_1$.

With the arrangement of the present invention, the voltage representing the reverse maximum speed is applied to the motor during the time interval from the rotation stop command to the reverse rotation of the motor, so that the time required for the motor to stop its rotation is much shorter than the conventional time period.

Where the present invention is incorporated in the system for reading radiation image information from the stimulable phosphor sheet, switching between the pre-reading mode and the main reading mode can quickly be effected, and the stimulable phosphor sheet can be fed at a stable secondary scanning speed while it is scanned fully over is image recording region. Furthermore, the system can quickly be readied for a next cycle of image readout operation. Where the stimulable phosphor sheet is used recyclically in a circulatory manner, the cycles of use of the sheet can be shortened.

The principles of the present invention are also applicable to other devices such as copying machines, facsimile machines, or the like.

Although a certain preferred embodiment has been shown and described, it should be understood that many changes and modifications may be made therein without departing from the scope of the appended claims.

What is claimed is:

1. An apparatus for controlling a motor to drive an image information carrier, comprising:
    a motor;
    direction detecting means for detecting the direction of rotation of said motor;
    motor rotating means for rotating said motor at a prescribed speed;
    stop switch means for cutting off an output signal applied by said motor rotating means to said motor;
    reverse maximum speed indicating means for issuing a signal to rotate the motor at a maximum speed in a reverse direction which is opposite to the direction in which the motor is rotated by said motor rotating means; and
    a selector circuit, responsive to an output signal from said stop switch means, for effecting switching from the output signal of said motor rotating means to the signal of said reverse maximum speed indicating means for application thereof to said motor, in order to stop the motor in the shortest possible time independent of the rotational position of the motor;
    wherein said motor rotating means comprises a speed computing unit for computing the speed of rotation of said motor, a speed setting unit for setting said motor at said prescribed speed, a comparator for generating a signal representing the difference between output signals from said speed computing unit and said speed setting unit, and a voltage computing unit responsive to the difference signal from said comparator for applying to said motor a voltage for rotating said motor substantially at said prescribed speed.

2. An apparatus according to claim 1, wherein said direction detecting means comprises a rotary encoder, said selector circuit being responsive to a motor rotation reversal signal from said rotary encoder for cutting off the voltage which drives said motor.

* * * * *